US006037955A

United States Patent [19]

DeBoer et al.

[11] Patent Number: 6,037,955

[45] Date of Patent: Mar. 14, 2000

[54] MICROFLUIDIC IMAGE DISPLAY

[75] Inventors: Charles D. DeBoer, Palmyra; Werner Fassler, Rochester; James E. Pickering, Bloomfield, all of N.Y.

[73] Assignee: Eastman Kodak Company, Rochester, N.Y.

[21] Appl. No.: 08/970,551

[22] Filed: Nov. 14, 1997

[51] Int. Cl.[7] .......... G01D 15/04

[52] U.S. Cl. .......... 346/140.1; 347/92

[58] Field of Search .......... 346/140.1; 379/92

[56] References Cited

U.S. PATENT DOCUMENTS

| | | | |
|---|---|---|---|
| 4,293,867 | 10/1981 | Isayama | 347/92 |
| 5,585,069 | 12/1996 | Zanzucchi et al. | 422/100 |
| 5,593,838 | 1/1997 | Zanzucchi et al. | 435/6 |
| 5,603,351 | 2/1997 | Cherukuri et al. | 137/597 |
| 5,611,847 | 3/1997 | Guistina et al. | 106/20 R |
| 5,679,139 | 10/1997 | McInerney et al. | 106/20 D |
| 5,771,810 | 6/1998 | Wolcott | 101/483 |

OTHER PUBLICATIONS

"Electroosmosis: A Reliable Fluid Propulsion System For Flow Injection Analysis", by P. Dasgupta and S. Liu, Anal Chem. 66, pp. 1792–1798 (1994).

*Primary Examiner*—N. Le
*Assistant Examiner*—Shih-Wen Hsieh
*Attorney, Agent, or Firm*—Raymond L. Owens

[57] ABSTRACT

A microfluidic display apparatus responsive to an image file for displaying a plurality of colored pixel, having at least one color for each pixel includes at least one fluid display chamber for displaying a color; a microchannel connected to the display chamber and including a first colored fluid which, when such fluid is moved to the display chamber, displays the first color as a pixel and a second colored fluid which, when moved to the display chamber, displays the second color as a pixel; and microfluidic pumps for each microchannel. A computer controls the microfluidic pumps in response to a particular pixel of the image file for selectively controlling the flow of fluid to the chamber for selectively displaying either the first or second colors or a fraction of each color thereof.

3 Claims, 5 Drawing Sheets

MICROFLUIDIC IMAGE DISPLAY

CROSS REFERENCE TO RELATED APPLICATIONS

Reference is made to commonly assigned U.S. patent application Ser. No. 08/868,426, filed Jun. 3, 1997 entitled "Continuous Tone Microfluidic Printing"; U.S. patent application Ser. No. 08/868,104, filed Jun. 3, 1997 entitled "Image Producing Apparatus for Microfluidic Printing"; U.S. patent application Ser. No. 08/868,100, filed Jun. 3, 1997 entitled "Improved Image Producing Apparatus for Uniform Microfluidic Printing"; U.S. patent application Ser. No. 08/868,416, filed Jun. 3, 1997 entitled "Microfluidic Printer on Receiver"; U.S. patent application Ser. No. 08/868,102, filed Jun. 3, 1997 entitled "Microfluidic Printing With Ink Volume Control." The disclosure of these related applications is incorporated herein by reference.

FIELD OF THE INVENTION

The present invention relates to displaying digital images by a microfluidic display of colored fluids.

BACKGROUND OF THE INVENTION

Microfluidic pumping and dispensing of liquid chemical reagents is the subject of three U.S. Pat. Nos. 5,585,069, 5,593,838, and 5,603,351, all assigned to the David Sarnoff Research Center, Inc. The system uses an array of micron sized reservoirs, with connecting microchannels and reaction cells etched into a substrate. Electrokinetic pumps comprising electrically activated electrodes within the capillary microchannels proved the propulsive forces to move the liquid reagents within the system. The electrokinetic pump, which is also known as an electroosmotic pump, has been disclosed by Dasgupta et al., see "Electroosmosis: A Reliable Fluid Propulsion System for Flow Injection Analyses", Anal. Chem. 66, pp 1792–1798 (1994). The chemical reagent solutions are pumped from a reservoir, mixed in controlled amounts, and then pumped into a bottom array of reaction cells. The array may be decoupled from the assembly and removed for incubation or analysis.

The above described microfluidic pumping device can be used as a display. The pumped fluids to be displayed become colored solutions comprising colorants such as dyes or pigments. The array of reaction cells may be considered display chambers to be used for picture elements, or pixels, in a display, comprising mixtures of pigments having the hue of the pixel in the original scene. Such a display has the advantage that it may be changed simply by pumping new fluids to the display chambers. However, such a display has stability problems. Liquids may evaporate, plugging the apparatus. Moreover, liquids are mobile and may mix together, thus spoiling the accurate display of the hues of the original scene. When changing the display there is the problem of the disposal of spent fluids. It would be desirable to have a microfluidic pumped display that had a stable image that could be easily changed.

SUMMARY OF THE INVENTION

It is the object of this invention to provide a stable image display that can be readily changed.

It is another object of the invention to provide a microfluidic display in which colored fluids do not have to be disposed of.

These objects are achieved by a microfluidic display apparatus responsive to an image file for displaying a plurality of colored pixels, means for providing at least one color for each pixel, comprising:

a) at least one fluid display chamber for displaying a color;

b) a microchannel connected to the display chamber and including a first colored fluid which, when such fluid is moved to the display chamber, displays the first color as a pixel and a second colored fluid which, when moved to the display chamber, displays the second color as a pixel; and c) microfluidic means for each microchannel, each microfluidic means being responsive to a particular pixel of the image file for selectively controlling the flow of fluid to the chamber for selectively displaying either the first or second colors or a fraction of each color thereof.

ADVANTAGES

An advantage of this invention is that the microfluidic display produces a stable image without having to change fluids.

Another advantage is that the images produced by the microfluidic display can be easily changed.

Another advantage is that the colored fluids of the display can be used and reused for many images.

DETAILED DESCRIPTION OF THE INVENTION

The present invention is described in relation to a microfluidic display apparatus which can display computer generated images, graphic images, line art, text images and the like, as well as continuous tone images.

Figure 1A:
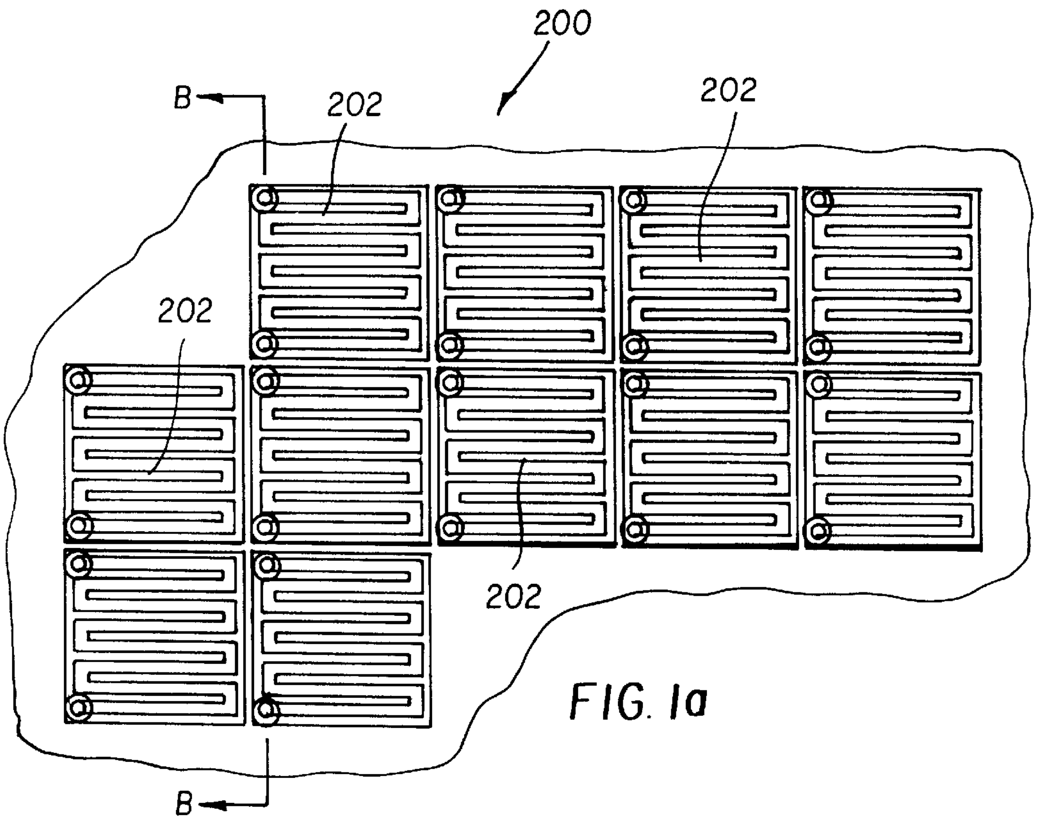
FIG. 1*a* is a top view of display chambers according to the first embodiment of the invention.

FIG. 1*a* is a top view of an array of display chambers 202 of a display 200 for viewing colored pixels. In this embodiment of the invention, the pixels are red, green and blue so the display is lit from behind to provide adequate brightness and contrast.

Figure 1B:
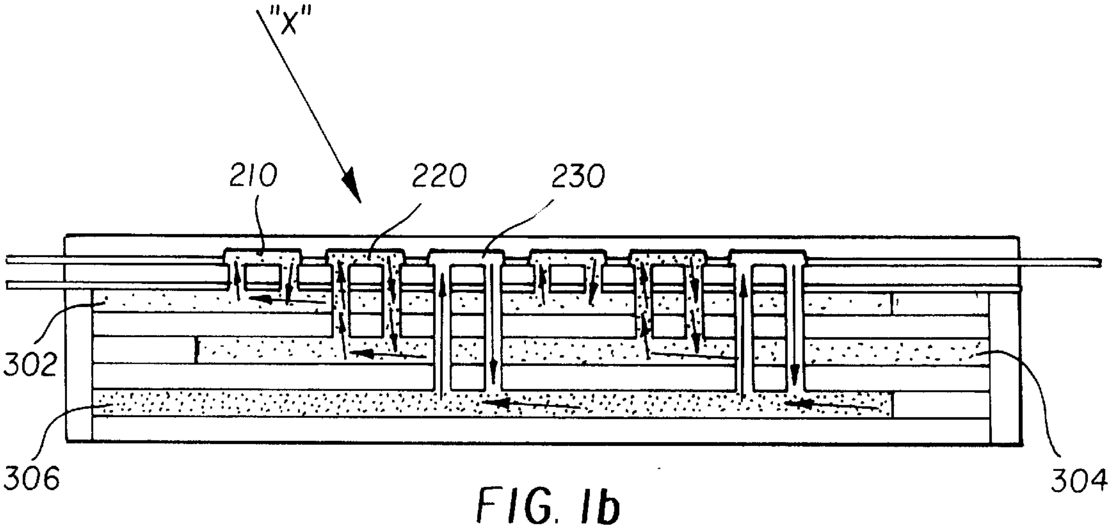
FIG. 1*b* is a cross-sectional view of FIG. 1*a* taken along the lines B—B, showing the microchannels which convey the colored fluids to the display chambers.

FIG. 1*b* shows a cross-sectional view of FIG. 1*a* taken through the lines B—B, showing microchannels 302, 304, and 306 which convey the colored fluid to the corresponding red 210, green 220, and blue 230 pixel display chambers.

Figure 2A:
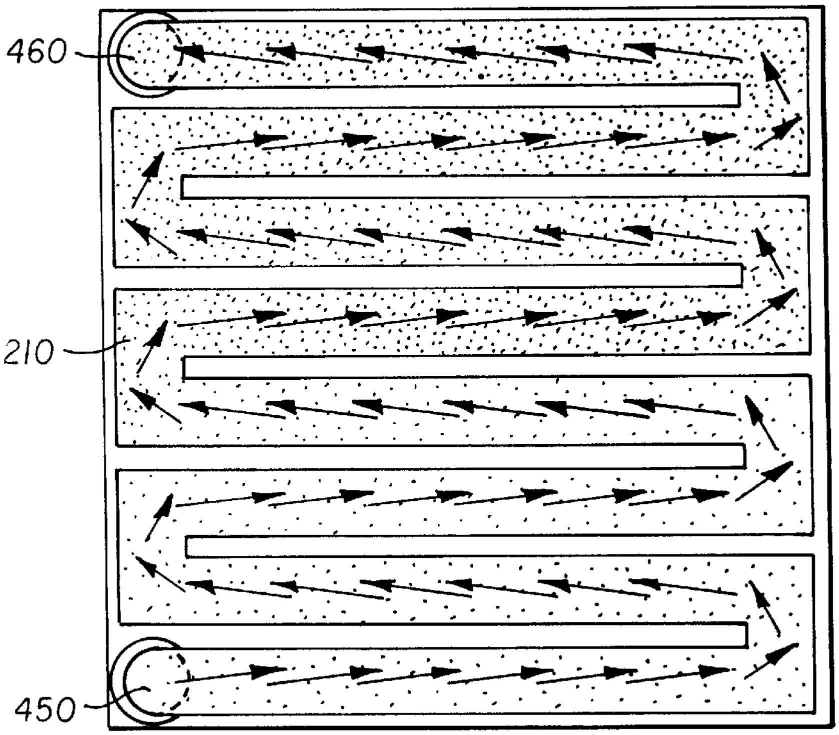
FIG. 2*a* is an enlarged view of a display chamber for displaying a pixel of FIG. 1, showing the process of increasing the amount of first colored fluid relative to the second colored fluid in a pixel.
Figure 2B:
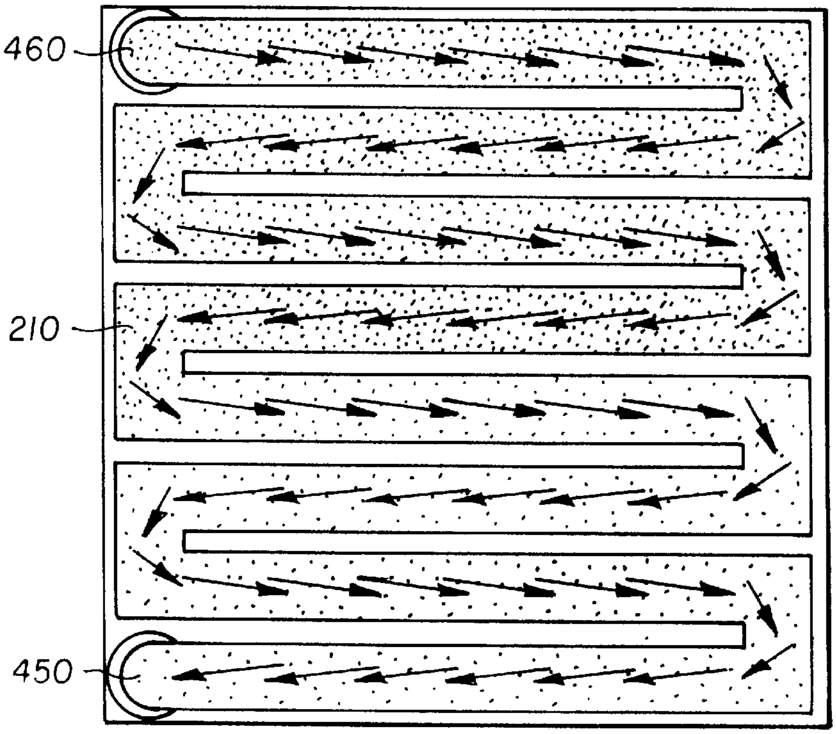
FIG. 2*b* is similar to FIG. 2*a* with the exception of it shows a process of increasing the amount of second colored fluid relative to the first colored fluid in a pixel.

FIG. 2*a* depicts an enlarged view of a red display cell 210 of FIG. 1*a*, showing by arrows the path of the red colorant moving from the color port 450 through the cell, thereby displacing the black colorant through the black port 460. FIG. 2*b* thus shows a pixel changing from a less saturated color to a more saturated color.

FIG. 2*b* depicts an enlarged view of the same red display cell 210 of FIG. 2*a*, showing by arrows the path of the black colorant fluid moving from a black port 460 through the cell, thereby displacing the red colorant fluid through the color port 450. FIG. 2*a* shows a pixel changing from a more saturated color to a less saturated color.

The colored fluids used in this invention are dispersions of colorants in common solvents in one embodiment of the invention. Examples of such colorants may be found in U.S. Pat. No. 5,611,847 by Gustina et al. Colorants may also be found in the following commonly assigned U.S. Pat. No. 5,679,139; U.S. patent application Ser. No. 08/699,962, filed Aug. 20, 1996; and U.S. patent application Ser. No. 08/699,963, filed Aug. 20, 1996; and in U.S. patent application Ser. No. 08/790,131, filed Jan. 29, 1997; and in U.S. patent application Ser. No. 08/764,379, filed Dec. 13, 1996. Colorants such as the Ciba Geigy Unisperse Rubine 4BA-PA, Unisperse Yellow RT-PA, and Unisperse Blue GT-PA are also preferred embodiments of the invention. The black fluid of the first embodiment and the colorless fluid of the second embodiment of the invention must not mix with the colored fluids or pure, saturated colors will be impossible to display. Therefore, if the colored fluids are in a solvent such as water, the black fluid must be in a solvent that is immiscible with water. Such a colorant is carbon black dispersed in a solvent such as mineral oil. It will be understood by those skilled in the art that other colorants can be used such as dyes which are soluble in the preferred solvent. It will also be understood by those skilled in the art that if the black or colorless fluid is based on water, the colored fluids must be in water immiscible solvents.

The microchannel capillaries and microfluidic pumps are more fully described in the references listed above.

Figure 3:
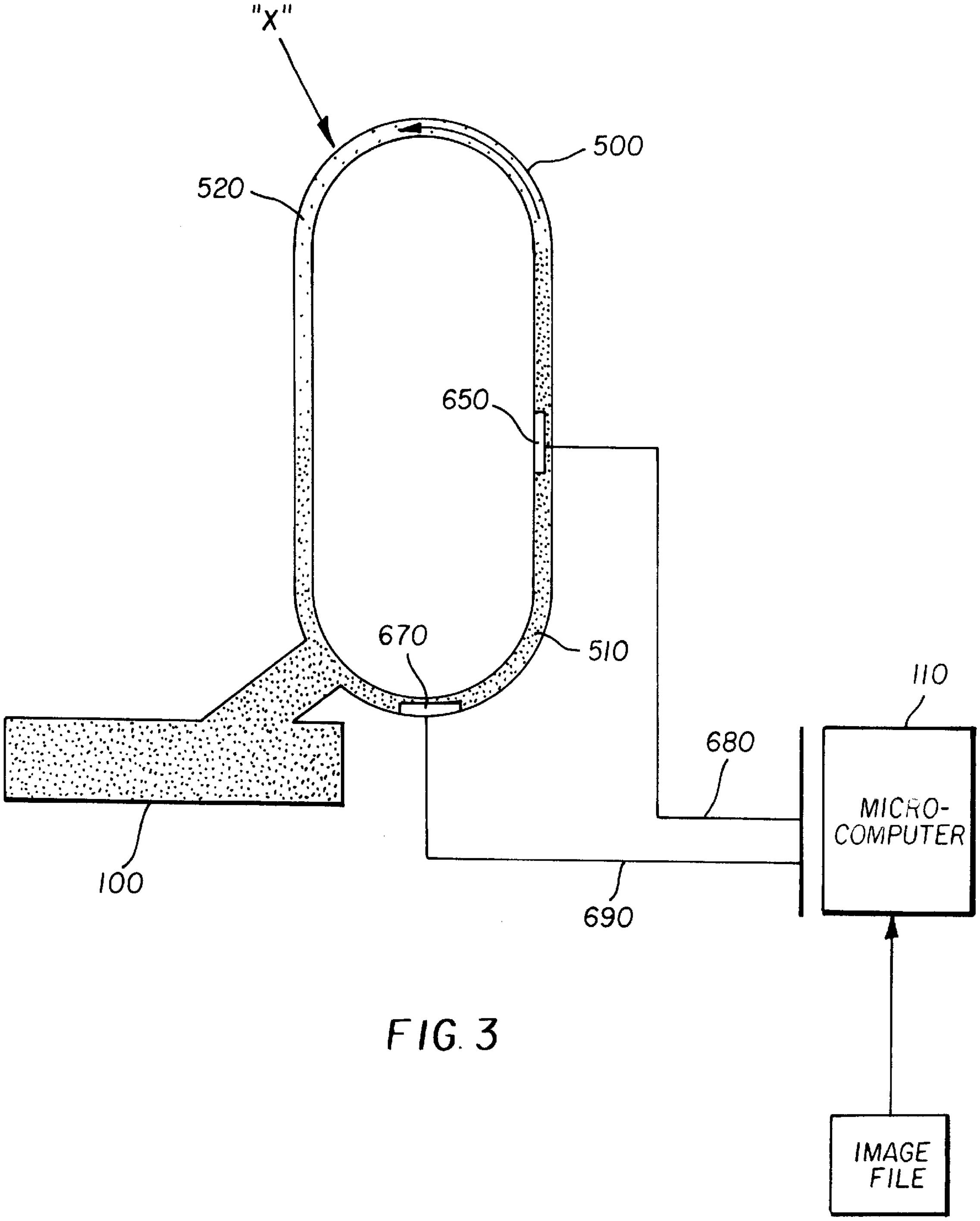
FIG. 3 is a schematic of the fluid path and control circuit for the first embodiment displaying a pixel.

FIG. 3 shows a schematic of the principle upon which the invention rests. The colored and black fluids are in a loop 500 which is just the path 210 shown in FIGS. 2*a* and 2*b* in straightened out form. The loop has two fluids in it which do not mix; the colored fluid 520 and the black fluid 510. The black fluid is open to a reservoir 100 to compensate for pressure changes in the atmosphere. A microfluidic pump 130 includes electrodes 650 and 670 which are connected to a computer 110 by electrical conductors 680 and 690. The microcomputer 110 includes digital-to-analog computer and is responsive to each digital pixel of an image file to supply the correct electrical signals to the electrodes 650 and 670 to control the flow of the fluid in the loop so that the correct composition of fluid is at the display chamber pointed to by the arrow "X". In FIG. 3, the signals to the electrodes 650 and 670 causes the black fluid 510 to move in the direction of the arrow when a pixel should have less color when a viewer views the display chamber. In the other situation, the fluids are moved in the reverse direction when more color is desired. Thus both the black fluid 510 and the colored fluid 520 are always present in the loop in the same amounts, but only part of the fluid is on display at a given time. In other words, under the control of the computer 110 and in response to a particular pixel of the image file, the fluids are selectively moved in the chamber so as to selectively display either the first or second colors or a fraction of each color thereof.

The operation of the display in this embodiment of the invention is as follows: An image file or a number of image file pixels are stored in the computer memory of the computer 110 as a sequence of numbers, commonly 8 bit numbers which represent the intensity of the red, green and blue pixels of the image, respectively. These numbers are interpreted by the computer 110, and when an image is desired, the computer 110 applies a electric potential bias to the electrodes 650 and 670 by way of conductors 680 and 690, respectively. In this way, the flow of fluid is controlled so that the appropriate amount of the two colored fluids is in the display chamber 202. The electrokinetic pumps (schematically shown by the electrodes 650 and 670) then deliver the colored fluids to the display 200 from corresponding microchannels 302–306 and through corresponding micronozzles 400–406. When a new image is desired, the electrokinetic pumps are reactivated by the computer 110 to pump colored fluids in or out of each chamber for the new image. When a white area is desired, all of the pixels in the white area are filled with colored fluid (red, green, and blue, respectively) and no black fluid is viewable. When red, green, and blue pixels are to be displayed, ordinarily a white backlight is provided. The white backlight is filtered through the red, green and blue pixels, producing red, green and blue spots of light which are integrated by the eye to produce the sensation of white. When a black area is desired, all of the pixels in the black area are filled with black fluid, and no light is transmitted from the backlight. When a red area is desired, only the red pixel display chambers are filled with colored fluid; the green and blue pixel display chambers are filled with black fluid. In this way any colored scene can be displayed, much as a computer monitor or color television set displays an image.

Figure 4A:
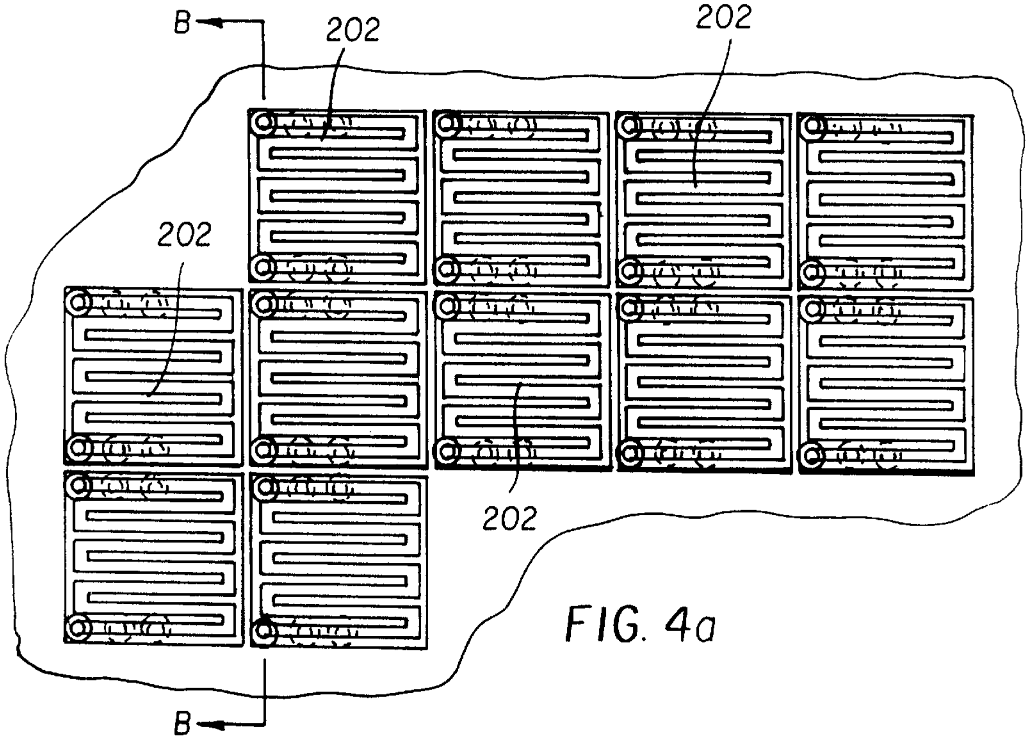
FIG. 4*a* is a top view of display chambers according to the second embodiment of the invention.

FIG. 4*a* is a top view of display chambers according to the second embodiment of the invention. In this embodiment for each pixel, display chambers 202 are stacked in a group of three, corresponding to the cyan, magenta, and yellow colorant fluids which are used to fill them. In this embodiment of the invention, the display may be viewed either by reflected light or by transmitted light from a backlight source. In operation, a white image area has no colorant in the pixel display chambers 240, 250, and 260. In a black image area, all three chambers are filled with cyan, magenta, and yellow colored fluid, respectively. In a red image area, the magenta and yellow chambers are filled while the cyan chamber is empty or filled with colorless fluid. In this way any colored scene may be displayed. The color ports 450 for each chamber and colorless ports 460 are shown in the figure.

Figure 4B:
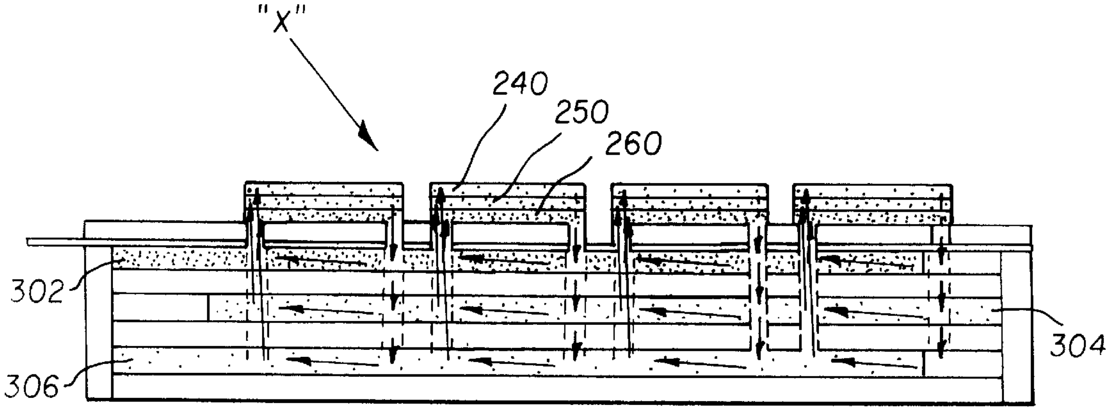
FIG. 4*b* is a cross-sectional view of FIG. 4*a* taken along the lines b—b, showing the microchannels which convey the colored fluids to the display chambers.

FIG. 4*b* is a cross-sectional view taken through lines b—b of FIG. 4*a*, showing the stack of pixel display chambers 240, 250, and 260 along with their corresponding microchannels 302, 304, and 306 which convey the colored and colorless fluids.

Figure 5:
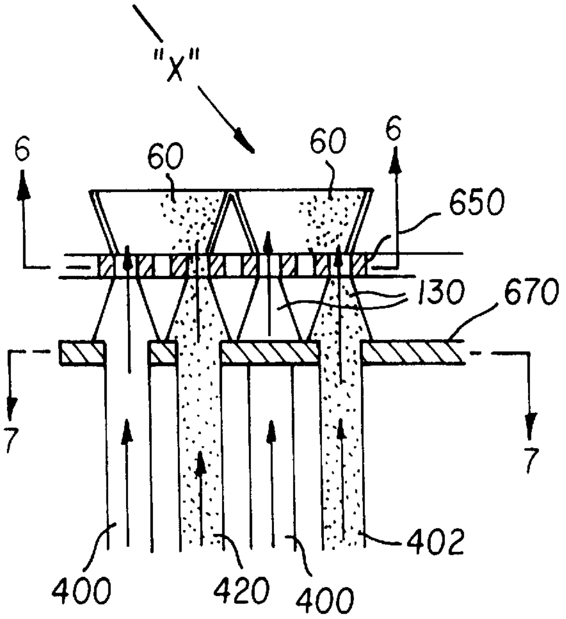
FIG. 5 is a cross-sectional view of the microfluidic pumps which move the ink through a microchannels.

FIG. 5 shows a cross-sectional view of microfluidic pumps 130. The colored fluids are delivered to the fluid display chambers respectively by colored fluid microchannels 400 and 402. The image produced by the pixel display chambers is viewed along the general direction indicated by the arrow "X".

Figure 6:
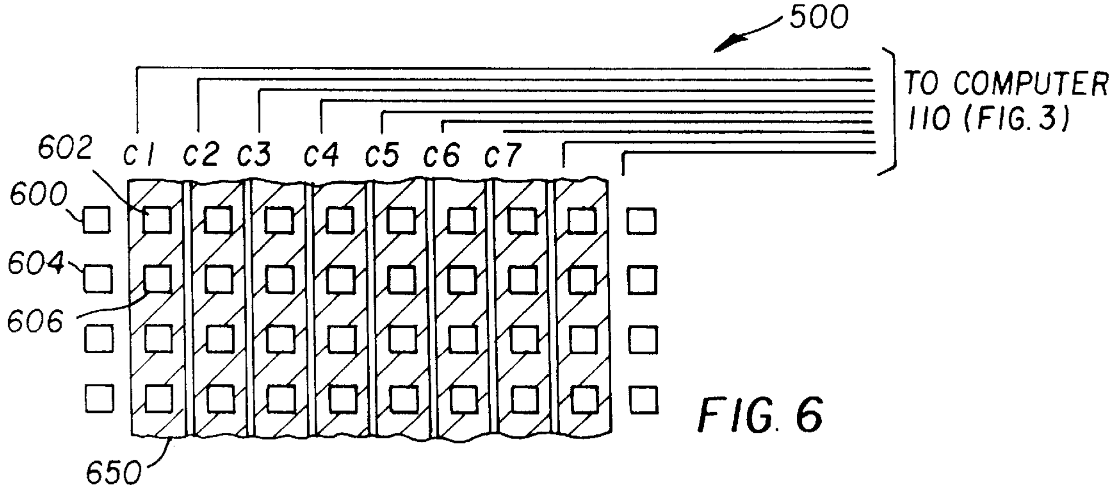
FIG. 6 is a top view through line 6—6 of the microfluidic display apparatus in FIG. 5 showing the top electrical connections to the microfluidic pumps.

A top view of the plane along the line 6–6 in FIG. 5 is shown in FIG. 6. The cyan, magenta, yellow, and colorless ink micronozzles 600, 602, 604, and 606 are distributed in the same arrangement as the colored fluid micro channels 302–304. The column electrodes 650 are shown connected to the conducting circuit 550, which is further connected to the computer 110.

Figure 7:
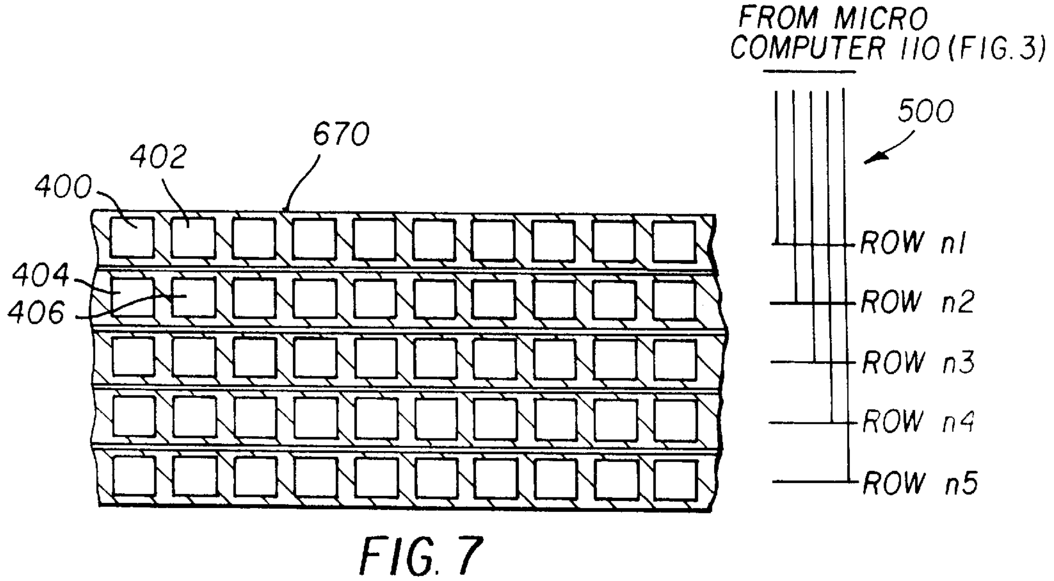
FIG. 7 is a top view through line 7—7 of the microfluidic display apparatus in FIG. 5 showing the electrical connections to the microfluidic pumps.

FIG. 7 shows a top view of the plane along the line 7–7 in FIG. 5. The cyan, magenta, yellow, and colorless fluid supplies 400, 402, 404, and 406 are shown. The row electrodes which complete the electrokinetic pump circuits are shown connected to the conducting circuit 500, which is further connected to the computer 110.

The invention has been described in detail with particular reference to certain preferred embodiments thereof, but it will be understood that variations and modifications can be effected within the spirit and scope of the invention.

PARTS LIST

| | |
|---|---|
| 100 | fluid reservoir |
| 110 | computer |
| 130 | microfluidic pump |
| 200 | display |
| 202 | pixel display chambers |
| 210 | red display chamber |
| 220 | green display chamber |
| 230 | blue display chamber |
| 240 | cyan display chamber |
| 250 | magenta display chamber |
| 260 | yellow display chamber |
| 302, 304, 306 | microchannels |
| 400, 402, 404, 406 | micronozzles |
| 450 | colorport |
| 460 | black or colorless port |
| 500 | fluid loop |
| 520 | colored fluid |
| 510 | black or colorless fluid |
| 650 | top electrode |
| 670 | bottom electrode |
| 680 | electrical conductor |
| 690 | electrical conductor |

What is claimed is:

1. A microfluidic display apparatus responsive to an image file for displaying a plurality of colored pixels by using different colored fluids, comprising:

a) a plurality of stacked fluid display chambers which are stacked in groups of fluid display chambers, each such group of stacked fluid display chambers being arrayed to display the color in a pixel;

b) a plurality of microchannels, with each microchannel being connected to a fluid display chamber in a stack of a group of fluid display chambers;

c) microfluidic means for each microchannel in a stack, each microfluidic means being responsive to a pixel of the image file for selectively controlling the flow of a colored fluid to its display chamber in a group of stacked fluid display chambers so as to produce a desired color in its pixel when viewed by an observer.

2. The microfluidic display apparatus of claim 1 including a first colored fluid can be either red, green, or blue, or cyan, magenta, or yellow, and a second colored fluid can either be black or white, respectively.

3. The microfluidic display apparatus of claim 1 wherein the microfluidic means includes electrodes disposed in the microchannel and circuit means for providing signals to such electrodes to control the flow of fluids in the micro channel.

* * * * *